July 16, 1968 R. L. WHITE 3,392,599

ENERGY ABSORBING DEVICE

Filed Dec. 30, 1966 2 Sheets-Sheet 1

INVENTOR.
Robert L. White
BY
D. L. Ellis
ATTORNEY

July 16, 1968  R. L. WHITE  3,392,599
ENERGY ABSORBING DEVICE
Filed Dec. 30, 1966  2 Sheets-Sheet 2

INVENTOR.
Robert L. White
BY
D. L. Ellis
ATTORNEY

United States Patent Office 3,392,599
Patented July 16, 1968

3,392,599
ENERGY ABSORBING DEVICE
Robert L. White, Frankenmuth, Mich., assignor to General Motors Corporation, Detroit, Mich., a corporation of Delaware
Filed Dec. 30, 1966, Ser. No. 606,431
10 Claims. (Cl. 74—492)

ABSTRACT OF THE DISCLOSURE

An automotive vehicle collapsible steering column assembly includes in one of the columnar members thereof telescopically related energy absorption cylinders having engaged with predetermined interference fit therebetween one or more annular rows of spheroids or similar rolling bodies of sufficiently higher hardness relative to the material of at least one of the cylinders as to be operative when the cylinders are forced to telescope relative to each other to roll and cause highly localized plastic deformation in at least one of the cylinders to absorb the energy of the movement therebetween.

---

The primary object of this invention is to provide a new and improved energy absorbing device for automotive vehicle collapsible steering column assemblies, bumper mounts and other safety related appliances, as well as for diverse other applications in other environments such as the household and aerospace vehicles.

Another object of this invention is to provide a new and improved energy absorbing device having highly predictable energy absorption performance, yet being of rugged construction insensitive to adverse environmental conditions and of relatively economical construction suitable for mass manufacture.

Yet another object of this invention is to provide a new and improved energy absorbing device applicable to a variety of different energy levels through simple adjustments in the character of the structural elements of the device.

A further object of this invention is to provide a new and improved energy absorbing device wherein energy associated with movement between a pair of structurally interrelated members is absorbed by predetermined localized plastic deformation of at least one thereof performed by a rolling body engaged therebetween in a manner to roll under the relative movement between the members.

Yet a further object of this invention is to provide a new and improved energy absorbing device including inner and outer movably related deformable energy absorption cylinders or like members having rollably engaged therebetween under predetermined interference fit one or more rolling bodies having such hardness relative to at least one member as to be operative under relative movement between the members to cause highly localized plastic deformation of one or both thereof to a predetermined degree absorbing the kinetic energy applied to the members.

Still another object of this invention is to provide a new and improved energy absorbing device according to the foregoing wherein the rolling bodies take the form of spheroids or like shaped adapted for highly local or substantial point contact with the energy absorption members such that the balls roll freely thereover during relative movement therebetween even in the presence of deleterious environmental conditions giving rise to defects in the spheroid contacting surfaces of the arbsorption members.

Yet a further object of this invention is to provide a new and improved energy absorbing device including a pair of telescopically and/or rotatably related energy absorption cylinders or like members having engaged with predetermined interference fit therebetween two or more annular or encircling rows of rolling bodies, the rows being axially separated along the cylinders a distance sufficient to insure firm lateral stability preventing binding in the assembly under any lateral or side loading incidental to the primary axial or torque loading energy which is to be absorbed.

Still a further object of this invention is to provide a new and improved automotive vehicle body collapsible steering column assembly provided with energy absorbing construction in one of the columnar members thereof including a pair of telescopically related cylinders interposed between the vehicle steering gear at one end and the steering wheel or other instrumentality at the other end, with a plurality of hard spheroids or similar rolling bodies being engaged between the cylinders under predetermined interference fit to cause highly localized deformation in one or both thereof under telescopic movement therebetween caused by impact energy applied to either end of the steering column assembly.

These and other objects, features and advantages of the invention will be readily apparent from the following specification and from the drawings wherein.

Figure 1:
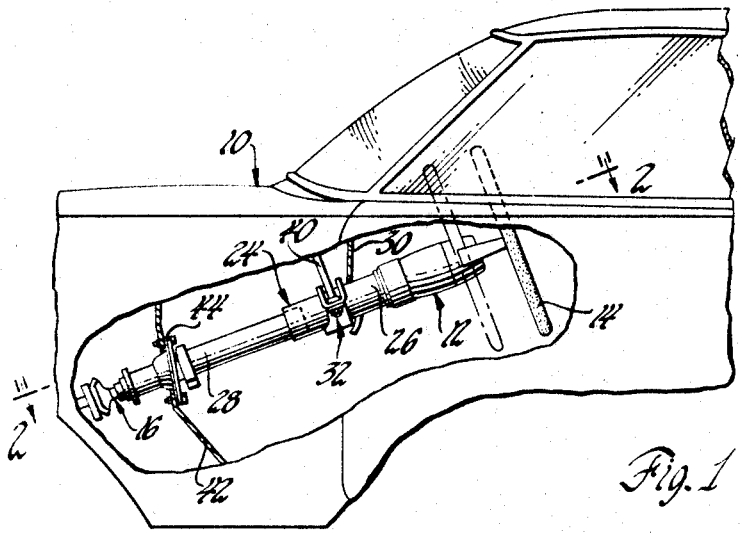
FIGURE 1 is a partially broken away fragmentary elevational view of an automotive vehicle body including a steering column assembly having an energy absorbing device according to this invention.
Figure 2:
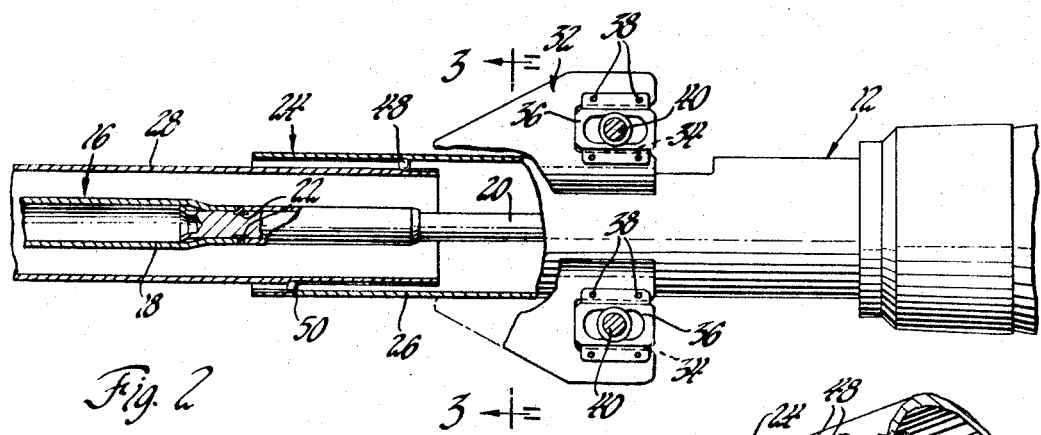
FIGURE 2 is an enlarged partially broken away view taken generally along the plane indicated by lines 2—2 of FIGURE 1.

Referring now particularly to FIGURE 1 of the drawings, an energy absorbing device according to the invention is specifically disclosed for vehicle passenger injury protection in an automative vehicle body, designated generally as 10, including a steering column assembly 12 extending from the vehicle steering gear at one end, not shown, to within the vehicle passenger compartment to mount at its other end a steering wheel 14. As best shown in FIGURE 2, a steering shaft 16 for operatively connecting the steering wheel 14 with the steering gear includes a pair of telescopically and nonrotatably related sections 18 and 20 adapted upon the application of sufficient axial thrust thereto to telescope in the direction of the applied thrust. The sections 18 and 20 are releasably held in normal operating relation by a plurality of injection molded plastic shear pins 22 subject to fracture under predetermined axial load on the sections. The steering shaft 16 is generally conventionally rotatably supported for normal operation of the vehicle steering gear by a surrounding generally tubular support jacket assembly 24 comprising upper and lower telescopically related cylindrical sections 26 and 28 respectively. Adjacent the steering wheel 14, cylinder 26 is releasably held on a vertical wall portion 30 of the conventional vehicle instrument panel structure by a one-way shearable bracket assembly including a generally U-shaped bracket member 32. The bracket member is provided with open-ended slots 34 receiving therein a pair of mounting capsules 36 having pairs of side flanges embracing the bracket and being releasably secured thereto by a series of plastic shear pins 38 injection molded within aligned apertures in the flanges and in the bracket member adjacent the side of the slots 34. Hanger bolts 40 depend from the vehicle cowl structure and project through apertures in capsules 36 to receive nuts bearing on the underside of the capsules. Flanges on bolts 40 engage the upper surfaces of capsules 36 to firmly vertically locate cylinder 26 on the instrument panel. Upon the application of forward axial thrust to cylinder 26 sufficient to shear pins, 38, the bracket member is permitted to move forwardly out of the capsules for release of the cylinder from the instrument panel. Upon rearward axial thrust to cylinder 26 however, there is met the reaction of bolts 40 which prevents rearward displacement of the cylinder from the instrument panel.

Cylinder 28 is fixedly secured to the firewall structure 42 of the body 10 by an anchor plate assembly 44 operative to prevent movement of the cylinder in either axial direction relative to the firewall under axial impact thrust applied to the cylinder from the steering gear or from the steering wheel 14. This assembly may include a bracket member received over cylinder 28 and welded or otherwise secured thereto, the bracket member being secured in turn to the firewall by a plurality of bolts or otherwise.

Figure 3:
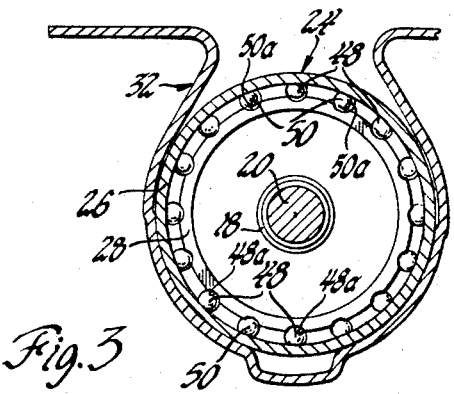
FIGURE 3 is an enlarged sectional view taken generally along the plane indicated by lines 3—3 of FIGURE 2.

Jacket assembly 24, in addition to rotatably supporting steering shaft 16, is further arranged as an energy absorbing device according to the invention operative to axially collapse or displace under predetermined axial impact load applied thereto, and to absorb or dissipate the energy of such impact. As seen best in FIGURES 2 and 3, upper and lower cylinders 26 and 28 are assembled to have a portion of the lower and smaller cylinder received a predetermined distance within the upper cylinder sufficient to have engaged therebetween two axially spaced annular or encircling rows 48 and 50 of rollable deforming bodies or spheroids, the spheroids of each row being equally spaced angularly about the cylinders. In relation to the angular spacing in one row, the spheroids of the other row are staggered, as seen in FIGURE 3. The spheroids 48 and 50 of each row are of such size as to be engaged between cylinders 26 and 38 with a predetermined interference fit; i.e., the diameters of the spheroids are predeterminedly significantly larger than the undeformed diametral distance between the cylinders at the various locations of the spheroids. Where, as herein disclosed, the spheroids in a row are of equal size, each will accordingly be of a diameter predeterminedly significantly larger than one-half the difference between the inner and outer dimensions of cylinders 26 and 28 respectively. The interference fit is selected to compressively load each of the spheroids between the cylinders to a degree whereat the spheroids exert a mean contact pressure on at least one of the cylinders over the area of contact therewith at a value above the contact yield pressure for the material of that cylinder, this latter pressure being identified as the pressure at which the contact region of the cylinder experiences the onset of plastic strain. With curved body contact, it is also known as the Hertzian yield stress which in the particular case of the spheroids has a value generally about 1.1Y for materials such as steel, where Y is the arbitrary yield stress or elastic limit of the cylinder material. Preferably, the cylinders 26 and 28 are of the same order of hardness and the interference fit is selected to have the spheroids exert a mean contact pressure in the range above 1.1Y for both cylinders. The arbitrary yield stress or elastic limit Y of each cylinder of course varies with the type of material, heat treatment, work hardening, etc. For any amount of plastic strain energy dissipation in the cylinders in the manner hereinafter explained, the hardness of the spheroids should be at least equal to that of the softer of the cylinders. For plastic deformation solely in the cylinders, the spheroids should be at least two and one-half times as hard as the cylinders which are to be plastically deformed for insurance against any significant deformation or fracture of the spheroids under the stress of the rolling, deforming action to be described. In the instant embodiment, the spheroids 48 and 50 are provided of standard commercial steel bearing balls and cylinders 26 and 28 are fabricated of commercial cold-rolled mild sheet or strip steel having a hardness on the order of one-fifth that of the balls. The cylinders may be round formed in a rolling mill or in a progressive die press and then provided with a welded or similarly locked seam, or alternatively may be of seamless construction. They may also be subsequently mandrel-drawn for minimal dimensional tolerance and increased hardness.

Spheroids 48 and 50 are operative under telescopic movement between cylinders 26 and 28 to roll along independent axial paths on the surface of the cylinders and produce highly localized energy dissipating plastic strain grooving therein. The amount of energy dissipation per unit travel of the cylinders is of course dependent on the degree or depth of plastic strain which is turn depends on the spheroid loading or interference fit. Again, if it is desired to deform only one of the cylinders for energy absorption or to deform both cylinders by differing amounts, the relative hardness of the cylinders and the spheroids is selected accordingly. With the diameters of the cylinders 26 and 28 being held at a constant value along their length, the plastic strain produced therein will be likewise constant over each succeeding increment of telescopic movement therebetween.

In steering column assembly 12, any axial impact loading, as for example on steering wheel 14 in a direction forwardly of the vehicle, is transferred from the cylinder 26 through the spheroids 48 and 50 and cylinder 28 to anchor plate assembly 44. The reaction obtaining in the firewall 42 and in the steering gear mount on the vehicle chassis holds the cylinder 28 and lower steering shaft section 18 against forward movement. Assuming the impact load to be of a degree sufficient to cause release of bracket member 34 from the capsules 36 and to begin rolling of the spheroids 48 and 50 over the contacting surfaces of the cylinders, the upper cylinder 26 telescopes forwardly on the lower cylinder and the shear pins 22 fracture to allow telescoping between steering shaft sections 18 and 20. Spheroids 48 and 50 are thus caused to roll and produce the highly localized plastic strain grooving in the cylinders extending axially thereof. This progressive plastic strain in the cylinders serves to gradually dissipate the impact energy as the cylinders telescope, until steering column collapse comes to a halt.

Figure 4:
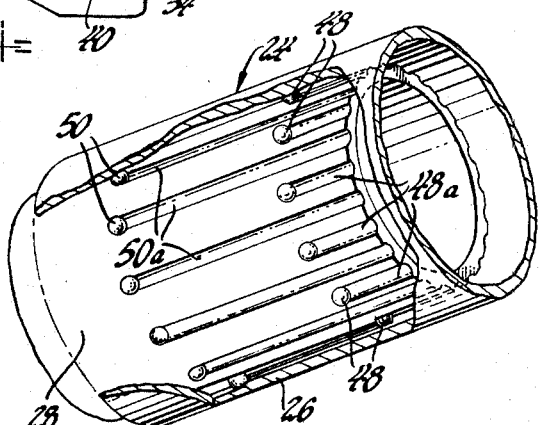
FIGURE 4 is a perspective view of a portion of FIGURE 2.

The grooves that are produced are similar to the grooving appearing in FIGURE 4, which shows the cylinders 26 and 28 in their initial assembled state. The assembly operation may include the use of a cylindrical fixture of a size and wall thickness suitable for insertion between the cylinders 26 and 28 and having withdrawal slots carrying and locating the two annular rows of spheroids 48 and 50. The fixture with spheroids 48 and 50 thereon may be located within cylinder 26 and forced therewith over the inner cylinder 28 such that the spheroids will roll to form grooves, such as 48a and 50a in the wall of the inner or lower cylinder 28 as shown. With spheroids 48 and 50 thus engaged between the cylinders in the position shown, they are operative for impact energy absorption in either impact direction by forming continuations of grooves 48a and 50a in cylinder 28, and by forming similar grooves in cylinder 26.

It will, of course, be appreciated that the impact absorption operation of spheroids 48 and 50 described above with reference to forwardly directed impact applies as well for rearwardly directed impact from the steering gear causing defomation of firewall 42. In this case, cylinder 28 is moved by the firewall to telescope rearwardly over cylinder 26, which latter is held stationary relative to the instrument panel by bracket assembly 32.

With the use of two spaced annular rows of spheroids, the disclosed construction has particular utility in such applications as the steering column assembly 12 in that the cylinders 26 and 28 are constrained against relative lateral movement and present substantial lateral rigidity against failure by vibration or "shake" fatigue induced by structure borne vibration transferred to the steering column assembly through chassis components. Further, the readily rollable axially spaced constraining connections between the cylinders provided by the rows 48 and 50 of spheroids insure against binding between the cylinders under telescopic movement therebetween caused by any loading at either end of the column which includes substantial lateral components causing beam bending therein. The spacing of the rows is selected for best results, and it is of course appreciated that the spheroids may be distributed axially of the cylinders in other configurations similar to the two distinct annular rows to achieve similar results.

The use of spheroids 48 and 50 provides for highly predictable energy absorption performance even in the presence of severe rust, scale, etc., caused by any deleterious environmental condition to which this energy absorption construction is exposed. Each spheroid rolls independently of its neighbors in the row to accommodate whatever macroscopic surface defects that it may encounter without affecting the rolling of the other spheroids.

Figure 5:
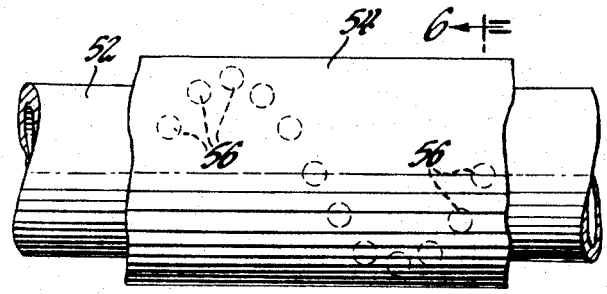
FIGURE 5 is an elevational view of another embodiment of an energy absorbing device according to this invention.
Figure 6:
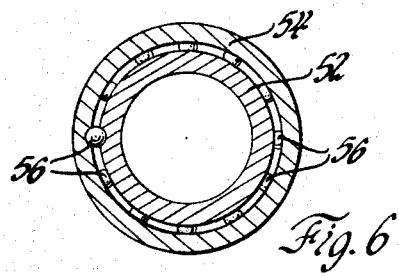
FIGURE 6 is a sectional view taken generally along the plane indicated by lines 5—5 of FIGURE 4.

It will be appreciated that the energy absorbing construction herein described is applicable for absorption of forms of kinetic energy other than that associated with the telescopic movement between cylinders 26 and 28. For example, in FIGURES 5 and 6, there is shown a modification wherein a pair of movably related inner and outer cylinders 52 and 54 have engaged with interference fit therebetween a helical row or array of axially spaced spheroids 56 operative to absorb the kinetic energy of both relative axial movement between the cylinders and relatively rotatable movement. Assuming one of the cylinders 52 and 54 is fixed, an advancing screw like motion on the other will cause spheroids 56 to roll with the moving cylinder to cause localized grooving deformation in one or both cylinders. This construction is also applicable for use in the absorption of pure torque energy between the cylinders, each spheroid in this case undergoing a rolling action to form a complete annular groove during two complete revolutions of one cylinder relative to the other. Likewise, strictly axial or telescopic motion of the cylinders produces axially extending grooves similar to that of the embodiment of FIGURES 1 through 4.

Figure 7:
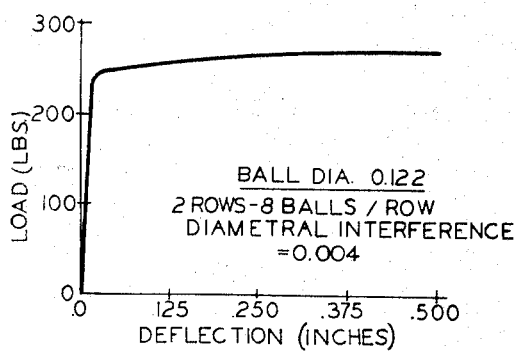
FIGURE 7 is a graph showing an energy absorption performance curve for a particular energy absorbing device constructed in accordance with the invention.

FIGURE 7 illustrates performance data for an energy absorbing device according to the invention wherein localized permanent deformation is produced in telescopic relatively axially movable inner and outer cylinder members similar to the construction shown in FIGURES 1 through 4. The data was taken from samples constructed as follows:

| Outer cylinder | Inner cylinder |
|---|---|
| .065 Wall thickness | .065 Wall thickness |
| 2.005 Outside diameter | 2.241 Inside diameter |

Material for both cylinders—SAE-1010 cold-rolled aluminum-kilned sheet metal—hardness $R_b$ 55-60.

The cylinders were seam welded and mandrel-drawn to the above inside and outside diameter specifications and experienced hardness increase up to about 70 in a Rockwell B scale measurement. The spheroids for the device were arranged in two annular rows of eight, each spheroid having a diameter of .122 in. For the above cylinder dimensions, the diametral interference in the engagement of each spheroid between the cylinders was .004 in. The spheroids were provided of steel balls of SAE-1010 steel, conforming to A.F.B.M.A. standards on tolerance and measuring 60 in a Rockwell C scale measurement. It is seen from FIGURE 7 that this energy absorbing construction requires a collapse load of approximately 250 lbs. to begin rolling of the spheroids and deformation of the cylinders and that the loading required to continue such rolling and deformation remains substantially constant throughout the telescopic motion between the cylinders, until the energy input represented by the area under the performance curve is entirely dissipated.

Figure 8:
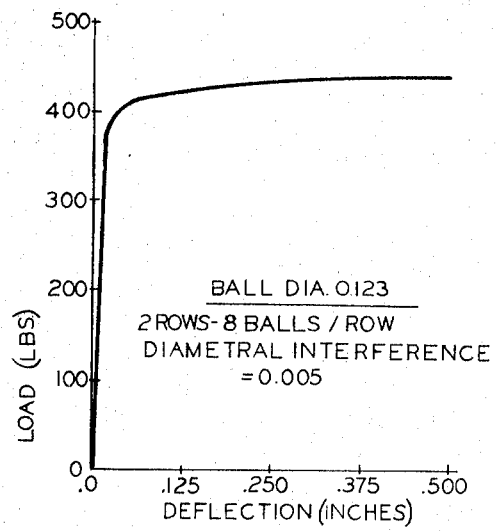
FIGURE 8 is a similar graph for a different energy absorbing device.

FIGURE 8, illustrates the performance of a similar construction differing only in a slightly higher interference fit between the cylinders arising from .123 in. balls. It is seen that approximately 400 lbs. of applied load is required to begin rolling of the spheroids and that again the required load remains constant throughout their excursion, typifying the performance available in all forms of the invention. While the above indicates the great variety of energy levels to which this energy absorbing device is applicable merely by change in interference fit, it will be appreciated that a similar variety of performance adjustments may be made through changes in the material properties of the cylinder wall material.

Figure 9:
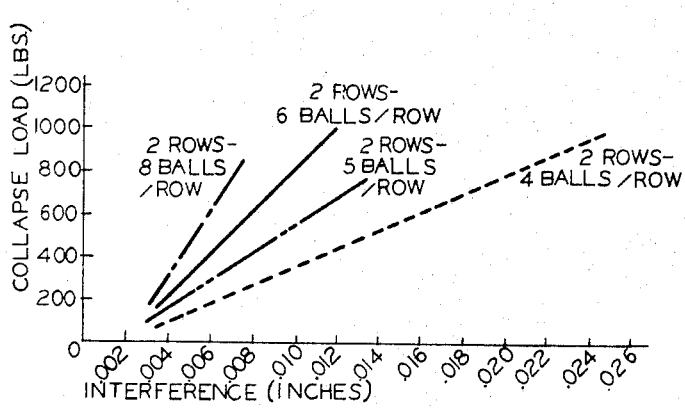
FIGURE 9 is a graph showing a family of curves indicating performance for a variety of different energy absorbing devices according to this invention.

In FIGURE 9 is illustrated a family of curves representing a comparison of the energy absorption performances available over a range of interference fits in constructions similar to that of FIGURES 1 through 4, having two annuluses of four, five, six, and eight spheroids each. Each curve represents a construction identical with the above examples as regards the cylinder specifications, the spheroid diameter being varied to obtain varying interference fit. It will be noted that the device having the lesser number of spheroids per row provides advantage in having a greater tolerance range of interference fit for a given small tolerance range of required collapse load. It is also of course appreciated that higher energy absorption is available with the greater number of spheroids per row and the consequent additional localized deformation taking place in the cylinders.

It is thus seen that a highly efficient, simply constructed, durable energy absorption construction is provided and that the construction affords application to a variety of uses and a variety of energy levels merely by appropriate changes in interference fit, material property selection, etc. The energy absorption attendant to the rolling of the spheroids on the cylinders is not necessarily limited to deep plastic flow grooving indicated in FIGURE 4, significant amounts of energy dissipation being available when loading the spheroids to a mean contact pressure above but near the plastic strain onset value of 1.1Y to leave residual plastic grooving of smaller depth. For the deep grooving, the spheroids are loaded with a mean contact pressure imparting "full" plasticity in the contact regions, at a value of about 3Y or above. It will further be appreciated that the members to be deformed are not necessarily limited to the cylindrical form shown, but may take various shapes such as triangular, rectangular, etc., which will present juxtaposed contact surfaces subject to localized deformation by spheroids or like rolling bodies. The rolling body is not necessarily limited to the spheroidal shape illustrated, but may take other shapes such as short rollers of cylindrical or barrel shape, discs, etc., suitable to the provision of highly localized contact for localized deformation and for unimpeded rolling action during their energy absorption excursion.

It is also apparent that energy absorbing devices according to this invention are not necessarily limited to one-shot operation, but may be used repeatedly. For example, in the construction of FIGURES 1 through 3, the cylinders 26 and 28 may be relatively rotated slightly following the first energy absorption excursion therebetween to reorient the spheroids 48 and 50 into locations affording area for additional axially extending localized deformation grooves in the walls of the cylinders when again subjected to axial force loading. If desired, the cylinders 26 and 28 may be relatively rotated after the spheroids 48 and 50 are inserted in the initial assembly operation earlier described. Such an assembly will then absorb energy resulting from the withdrawal of one cylinder from the other as well as their telescopic collapse. Similar adjustments may be made with the embodiment of FIGURES 5 and 6 and the other alternative forms of the invention. The latter expedient may also be preferred for the assembly of the spheroids between the cylinders; i.e., dropping the spheroids freely in stamped or otherwise preformed juxtaposed short grooves in the cylinders, and then forcibly oppositely rotating the cylinders slightly to place the spheroids into interference fit relation therewith ready for impact absorbing operation.

Should it be desired to provide an energy absorbing device according to the principles of the invention in which the starting or collapse load is of a relatively low value and increases progressively during relative displacement between the energy absorption members, the above described constructions can be altered in several ways to accomplish the purpose. For example, one or both cylinders may be provided with continuous varying outer or inner surface dimension to effect a taper or the like whereby the spheroids encounter increasing interference between the members as they telescope relative to each other. Similarly, the wall thickness of one or both members may be varied to present increasing resistance to plastic deformation. In some instances, it may be found that a generally flat energy absorbing curve as illustrated in FIGURES 7 and 8 is preferable but that the starting or collapse load is too high during that incremental time period of initial load or impact application. In such case, the energy absorption members may be initially assembled generally in such position as indicated in FIGURE 4 to form the initial plastic strain grooving, and then withdrawn to a position wherein the spheroids or other rolling bodies rest in the preformed grooves a distance away from the ends of the grooves sufficient to allow the members to telescope toward their initial assembled position under impact without experiencing the normal rolling interference of the spheroids until the latter are again located at the ends of the preformed grooves.

Having thus described the invention, what is claimed is:

1. A device for absorbing the kinetic energy of impacts comprising a pair of members arranged for movement relative to each other upon the application of impact force thereto, and a rolling body engaged between said members with predetermined interference fit and having portions formed for localized contact therewith, said rolling body portions having a hardness measurement sufficiently higher than the hardness measurement of at least one of said members and said interference fit being of such degree as to effect predetermined localized plastic deformation along a path of travel in at least one of said members as said rolling body rolls due to relative movement therebetween thereby to absorb the energy of such movement.

2. A device for absorbing the kinetic energy of impacts comprising a pair of members arranged for movement relative to each other upon the application of impact force thereto, and a plurality of spheroids engaged between said members with predetermined interference fit, said spheroids having a hardness measurement sufficiently higher than the hardness measurement of at least one of said members and said interference fit being of such degree as to have said spheroids operative to roll and cause predetermined localized plastic deformation in at least one of said members along the paths of travel of said spheroids during said relative movement between said members thereby to absorb the energy of such movement.

3. A device for absorbing the kinetic energy of impacts comprising inner and outer cylinders movable relative to each other upon the application of impact force thereto, and a plurality of spheroids engaged with predetermined interference fit between said cylinders, said spheroids having a hardness measurement sufficiently higher than the hardness measurement of at least one of said cylinders and said interference fit being of such degree as to have said spheroids operative to roll and cause predetermined plastic strain grooving in at least one of said cylinders along the paths of travel of said spheroids during said relative movement between said cylinders thereby to absorb the energy of such movement.

4. A device for absorbing the kinetic energy of impacts comprising a pair of coaxially arranged members movable relative to each other upon the application of force thereto, and a plurality of rolling bodies interposed between said members with predetermined interference fit and being arranged in at least two axially spaced encircling rows, said rolling bodies having a hardness characteristic sufficiently higher than at least one of said members and said interference fit being of such degree as to effect predetermined localized plastic deformation along a path of travel in at least one of said members as said rolling bodies roll due to relative movement therebetween thereby to absorb the energy of such movement.

5. A device for absorbing the kinetic energy of impacts comprising a pair of generally coaxially arranged cylinders telescopable relative to each other upon the application of generally axially directed impact force thereto, and a plurality of spheroids interposed between said cylinders with predetermined interference fit, said spheroids being arranged in at least two encircling rows spaced axially of said cylinders with the spheroids of one row being staggered angularly with respect to the spheroids of one row being staggered angularly with respect to the spheroids of the adjacent row or rows, said spheroids having a hardness measurement sufficiently higher than the hardness measurement of at least one of said cylinders and said interference fit being of such degree as to effect plastic strain grooving in at least one of said cylinders as said spheroids roll due to telescopic movement therebetween to absorb the energy of such movement.

6. A device for absorbing the kinetic energy of impacts comprising a pair of coaxially arranged members rotatable relative to each other upon the application of torque thereto, and a plurality of rolling bodies engaged between said members with predetermined interference fit, said rolling bodies being arranged in a helical row extending axially along said members, said rolling bodies having a hardness measurement sufficiently higher than the hardness measurement of at least one of said members and said interference fit being of such degree as to effect predetermined localized plastic deformation in at least one of said members due to relative rotation therebetween thereby to absorb the energy of such rotation.

7. In a vehicle steering system of the type having a steering gear, a manual steering instrumentality, and telescopic steering shaft means for operatively connecting said instrumentality with said steering gear, the improvement comprising a pair of telescopically related energy absorption members arranged about said steering shaft means intermediate said steering gear and said instrumentality, and a plurality of rolling bodies engaged with predetermined interference fit between said members, said rolling bodies having a hardness measurement sufficiently higher than the hardness measurement of at least one of said members and said interference fit being of such degree as to have said rolling bodies operative to roll due to telescopic movement between said members resulting from the application of force thereto from said instrumentality or said steering gear and cause predetermined highly localized deformation in at least one of said members to absorb the energy of such movement.

8. The combination recited in claim 7 wherein said members rotatably support said steering shaft means for operation of said steering gear by said instrumentality.

9. A device for absorbing the kinetic energy of impacts comprising a pair of members arranged for movement relative to each other upon the application of impact force thereto, and a rolling body engaged between said members for predetermined interference fit and having portions formed for localized contact therewith, said rolling body portions having a hardness measurement sufficiently higher than the hardness measurements of both said members and said interference fit being of such degree as to effect predetermined localized plastic deformation along a path of travel in both said members as said rolling body rolls due to relative movement therebetween thereby to absorb the energy of such movement.

10. A device for absorbing the kinetic energy of impacts comprising a pair of generally coaxially arranged cylinders telescopable relative to each other upon the application of generally axially directed impact force thereto, and a plurality of spheroids interposed between said cylinders with predetermined interference fit, said spheroids being arranged in at least two encircling rows spaced axially of said cylinders with the spheroids of one row being staggered angularly with respect to the spheroids of the adjacent row or rows, said spheroids having a hardness measurement at least two and one-half times higher than the hardness measurement of either of said cylinders and said interference fit being of such degree as to effect plastic strain grooving in both said cylinders as said spheroids roll due to telescopic movement therebetween thereby to absorb the energy of such movement.

References Cited
UNITED STATES PATENTS

| | | | |
|---|---|---|---|
| 3,144,918 | 8/1964 | Picton et al. | 188—1 |
| 3,195,686 | 7/1965 | Johnson | 188—1 |
| 3,308,908 | 3/1967 | Bunn | 188—1 |

MILTON KAUFMAN, *Primary Examiner.*

UNITED STATES PATENT OFFICE
CERTIFICATE OF CORRECTION

Patent No. 3,392,599                                              July 16, 1968

Robert L. White

It is certified that error appears in the above identified patent and that said Letters Patent are hereby corrected as shown below:

Column 1, lines 63 and 64, "substantial" should read -- substantially --; line 68, "arbsorption" should read -- absorption --. Column 4, line 27, "is" should read -- in --. Column 5, about line 64, "Outer cylinder Inner cylinder" should read -- Inner cylinder Outter cylinder --; about line 67, "sheet metal" should read -- sheet steel --. Column 8, line 34, cancel "of one row being staggered angularly with respect to the"; line 35, cancel "spheroids", first occurrence.

Signed and sealed this 30th day of December 1969.

(SEAL)
Attest:

Edward M. Fletcher, Jr.                                    WILLIAM E. SCHUYLER, JR.
Attesting Officer                                                   Commissioner of Patents